F. P. PRENDERGAST.
SPRING WHEEL.
APPLICATION FILED APR. 2, 1909.
955,545.
Patented Apr. 19, 1910.
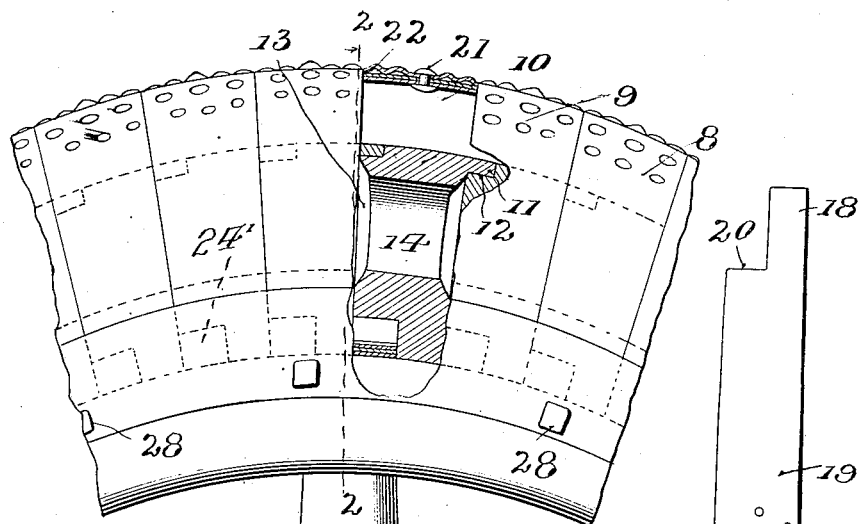
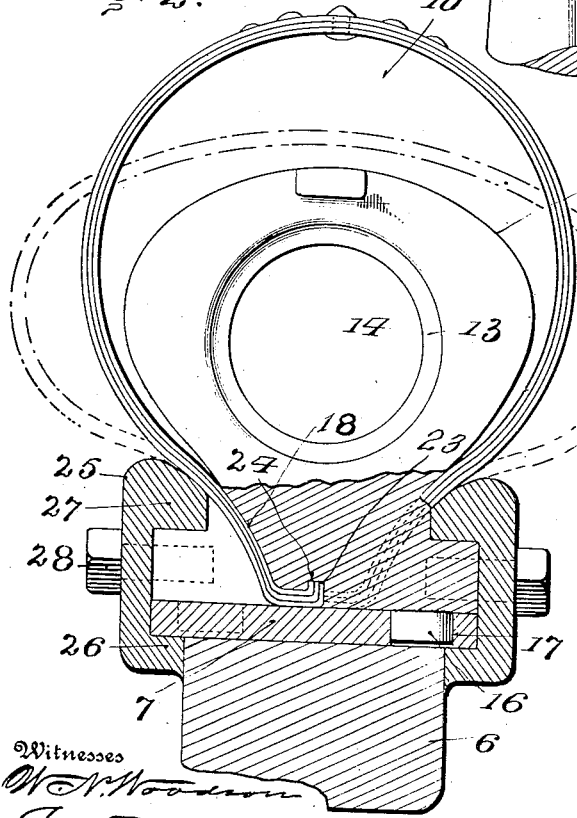
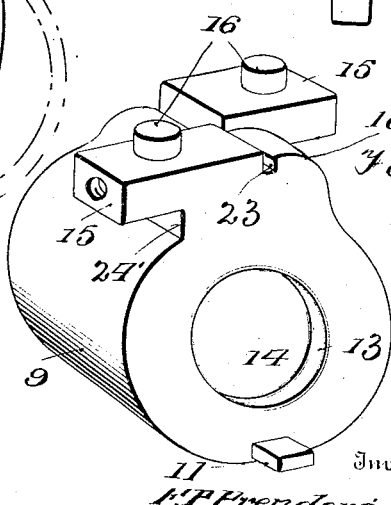
Inventor
F. P. Prendergast
Witnesses
By
R. H. A. B. Lacey, Attorneys.

UNITED STATES PATENT OFFICE.

FRANK P. PRENDERGAST, OF DAGUS MINES, PENNSYLVANIA.

SPRING-WHEEL.

955,545.

Specification of Letters Patent. Patented Apr. 19, 1910.

Application filed April 2, 1909. Serial No. 487,522.

*To all whom it may concern:*

Be it known that I, FRANK P. PRENDERGAST, citizen of the United States, residing at Dagus Mines, in the county of Elk and State of Pennsylvania, have invented certain new and useful Improvements in Spring-Wheels, of which the following is a specification.

This invention relates to spring tires for vehicle wheels and has for its object to provide a tire having a resilient tread, thereby to cushion the wheel and prevent injury to the same when traveling over rough or undulating roads.

A further object of the invention is to provide a spring tire including an outer metallic casing or tread member having an inner core member spaced therefrom and adapted to form a support for the tread member when the latter is depressed by the weight of a vehicle.

A further object is to form inner and outer members of the tire in sections having inter-engaging parts, and further to provide means for locking the inter-engaging ends of said sections in position on the rim or felly of the wheel.

A still further object of the invention is generally to improve this class of devices so as to increase their utility, durability, and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a side elevation partly in section of a portion of a vehicle wheel provided with a resilient tire constructed in accordance with my invention; Fig. 2 is a vertical sectional view taken on the line 2—2 of Fig. 1; Fig. 3 is a perspective view of one of the rim core sections; Fig. 4 is a plan view of the inner face of one of the metallic strips or sections constituting the yieldable tread member.

Corresponding and like parts are referred to in the following description and indicated in all the views of the drawings by the same reference characters.

The improved spring tire forming the subject matter of the present invention, may be used in connection with traction wheels of automobiles, bicycles and similar vehicles, and by way of illustration is shown in connection with a vehicle wheel of the ordinary construction, in which 5 designates the spokes, 6 the felly, and 7 the rim, the latter being shrunk on the felly 6 or otherwise firmly secured thereto, as shown.

The tire member comprises an outer resilient tread member 8 and a relatively rigid inner core member 9, the latter being spaced from the interior wall of the resilient tread member to produce an intermediate circumferential chamber 10.

The core member 9 is preferably formed in sections, each of which is provided with a laterally extending tongue 11 adapted to enter a correspondingly shaped seating recess 12 formed in the upper portion of a mating core section when several of said sections are assembled. The opposite vertical edges of each section are preferably hollowed out or countersunk at 13 and provided with a transverse bore 14, so as to lighten the same.

Extending laterally from the lower portion of each core section, are oppositely disposed attaching lugs 15 having cylindrical pins or studs 16 depending therefrom and adapted to enter correspondingly shaped openings 17 formed in the rim 7, thereby to anchor the inner core member on the felly of the wheel.

One side of each core section at the lugs 15, is cut-away to produce a seating recess adapted to receive the reduced ends 18 of the tread sections 19. The tread sections 19 are preferably formed of superposed strips of spring metal, of the configuration shown in Fig. 4 of the drawings, and each provided with oppositely disposed shoulders 20 defining the reduced extensions 18, the strips of metal constituting each tread member being secured together by a bolt or similar fastening device 21.

The upper strip of metal of each tread section is preferably stamped, pressed or otherwise formed with a concentric series of projections 22 which form a rough surface for the exterior of the tire, and thus effectually prevents skidding of the latter.

The lower portion of each core section between the pins 16, is formed with a longitudinally disposed groove or channel 23 adapted to receive the terminal lips or flanges 24 of the resilient tread sections 19 when the several parts are assembled, as best shown in Fig. 2 of the drawing.

Attention is here called to the fact that when the tread member is positioned over the inner core member, the reduced extensions 18 of the strips 19, will extend within the seating recesses 18', of the core sections with the lips 24 of said extensions seated in the groove 23 and with the shoulders 20 bearing against the shoulders 24' of the adjacent core sections, and in which position they will be effectually locked by suitable clamping members 25. The clamping members 25 are disposed on opposite sides of the vehicle wheel and are each provided with an inwardly extending flange 26 arranged to bear against the adjacent projecting ends of the rim 7 and an enlarged head 27 adapted to bear against the adjacent sections of the resilient tread member, the members 25 being locked in position on the felly of the wheel by bolts or similar fastening devices 28 which extend through the clamping members and engage correspondingly threaded openings formed in the adjacent attaching lugs 15, as shown.

It will here be noted that the heads 27 by engagement with the exterior walls of the resilient tread sections, serve to support said tread sections above the reduced extensions 18, and also form bearing surfaces for said tread members when the latter are moved to the dotted line position shown in Fig. 2 of the drawings, by the weight of a vehicle.

Thus it will be seen that the sectional core member not only serves to reinforce and strengthen the wheel, but also serves to limit the inward movement of the tread member and form a support for the latter when said tread member is depressed.

It will also be noted that connection between the core sections and tread sections, is such that a single fastening device may be employed for retaining the sections of both members in position on the felly of a wheel.

Having thus described the invention, what is claimed as new is:

1. A vehicle wheel including a felly, an outer resilient tread member, a hollow sectional core member disposed within the tread member and having its outer portion spaced from said tread member and means engaging the core member and bearing against the tread member for retaining both the core and tread member in position on the felly.

2. A vehicle wheel including a felly, an outer resilient tread member, a sectional core disposed within the tread member and having its outer portion spaced from said tread member, lugs extending laterally from the core sections and means engaging the lugs and bearing against the tread member for retaining both the core and tread member in position on the felly.

3. A vehicle wheel including a felly, a sectional resilient tread member, the sections of which are provided with terminal lips, a sectional core member disposed within the tread member and having its outer portion spaced from the tread member and provided with a groove adapted to receive the terminal lips of the tread sections, lugs extending laterally from the core sections, and means engaging said lugs for retaining both the core and tread members in position on the felly.

4. A vehicle wheel including a felly, a resilient tread member, a sectional core member disposed within the tread member and formed of a plurality of sections each of which is provided with a tongue adapted to enter a recess in a mating section when said sections are assembled, lugs extending laterally from the core sections, and a clamping device engaging the lugs for retaining the tread and core members in position on the felly.

5. A vehicle wheel including a felly and rim, a resilient tread member formed of a plurality of superposed sections each provided with terminal lips, a sectional core member disposed within the tread member and provided with a longitudinal groove adapted to receive the lips of the tread sections, lugs projecting laterally from the core sections and provided with means for engagement with the rim, clamping members embracing the lugs and bearing against the felly and yieldable tread member respectively, and fastening devices extending through the clamping members and engaging the lugs.

6. A vehicle wheel including a felly and rim, a resilient tread member, a sectional core member disposed within the tread member and having its outer portion spaced from said tread member, lugs extending laterally from each core section and provided with depending pins adapted to enter corresponding openings formed in the rim, clamping members embracing the rim at the felly of the wheel and provided with enlarged heads adapted to bear against the yieldable tread member, and means extending through the clamping members and engaging the lugs for retaining the several parts in position on the felly.

7. A vehicle wheel including a felly and rim, a sectional core member, each section of which is provided with a seating recess and cut-away portions defining laterally extending lugs, pins depending from the lugs of the core sections and arranged to enter corresponding openings formed in the rim of the wheel, a resilient tread member formed of superposed plates having their opposite ends provided with shoulders adapted to bear against the lugs and defining reduced extensions arranged to enter the seating recesses of the core sections, lips formed on the reduced extensions of the tread sections and extending within the grooves of the core sections, and means engaging the lugs and bearing against the felly and resilient tread member respectively for retaining the parts in position on said felly.

8. A vehicle wheel including a felly and rim, a resilient tread member secured to the rim and formed of superposed plates, one of which is provided with a rough portion constituting a skidding surface, a core disposed within the tread member and having its outer portion spaced from said tread member, said core and tread members being provided with inter-engaging parts, and means engaging the tread member and core member and bearing against the rim for locking the several parts in position on said felly.

9. A vehicle wheel including a felly and rim, a resilient tread member carried by the rim, a sectional core member disposed within the tread member and having its outer portion spaced from said tread member and provided with laterally extending attaching lugs, pins depending from the lugs and seated in openings in the rim of the wheel, said core sections and tread member being provided with inter-engaging parts, and clamping members embracing the rim and bearing against the tread member and felly of the wheel for retaining the several parts in position thereon.

In testimony whereof I affix my signature in presence of two witnesses.

FRANK P. PRENDERGAST. [L. S.]

Witnesses:
N. B. HALL,
JOHN BEVERIDGE.